Aug. 15, 1967    J. HATTEN    3,336,044
CHASSIS FOR VEHICLE
Filed June 7, 1965

INVENTOR
JOSTEIN HATTEN
By Young + Thompson
ATTYS.

3,336,044
CHASSIS FOR VEHICLE
Jostein Hatten, Slettaas pr. Rena, Norway
Filed June 7, 1965, Ser. No. 462,013
Claims priority, application Norway, June 20, 1964,
153,743
8 Claims. (Cl. 280—104.5)

This invention relates to a chassis for a vehicle with four wheels or pairs of wheels, each wheel being carried on a shaft journal at the free end of an arm pivoted in the chassis.

The chassis, according to the invention, is particularly intended for vehicles for use on uneven surfaces, for example trailers for timber, and the object of the invention is to improve the driving qualities on uneven surfaces compared with previously known vehicles of this type.

This is achieved, according to the invention, by the two arms pivoted at either side towards the front end of the chassis with their free ends pointing to the rear, bearing against the front free ends of the rear arm-pairs, which are in the form of double arms, and which at their fulcrums are pivoted on the chassis, the other ends carrying rear wheels or wheel pairs. In this manner, a reciprocal interdependence of the swinging movements of the wheels on each side of the vehicle is achieved without the use of spring mechanisms.

Also with a view to establishing interdependence between the wheels on either side of the vehicle, a hydraulic lifting mechanism may, according to the invention, be fitted at the point of engagement between the free end of the front arm-pair and the front free end of the rear arm-pair. With the aid of these lifting mechanisms, the vehicle may be raised on one side as desired to suit prevailing conditions, for example when driving along a slope.

In order to increase the loading capacity of the vehicle without increasing the size of the tires, it is usual to make use of wheel pairs and, in order to give these wheel pairs a surer footing on uneven surfaces, the shaft journals, according to the invention, are made in the form of double cranks, the centre part of each being pivoted in the arm and each of the two halves of the crank carrying one wheel of a wheel pair. Preferably, the halves of the double cranks should be placed at 180° to one another.

An example of the invention will be described below in more detail with reference to the drawing.

Figures 1, 2:
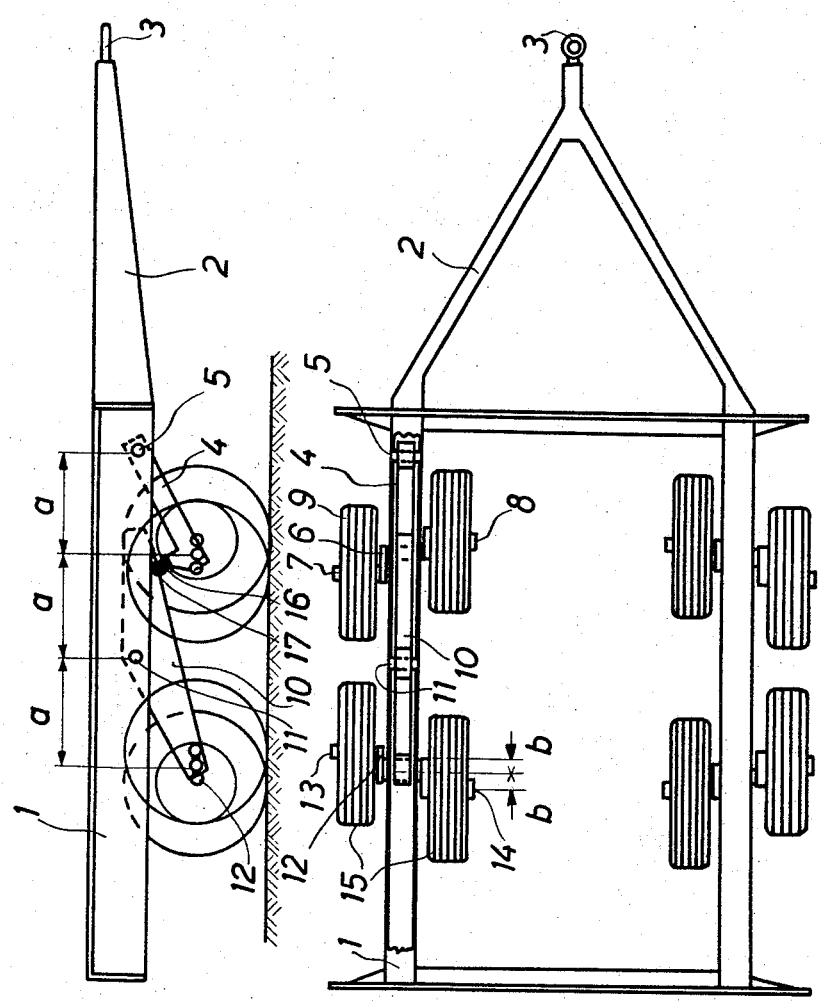
FIG. 1 is a side view of a vehicle chassis according to the invention.
FIG. 2 shows a top plan view of FIG. 1 with parts broken away.

The example shown is a trailer particularly intended for timber and consists of a rigid frame 1 with a triangular draw-bar 2 narrowing to the front and ending in an eye 3 for the draw-hook. Pivoted in the frame at their free ends on axles 5 there are two arms 4. At their other free ends, each arm carries an axle 6, which is free to rotate, and which forms the middle part of a double crank 6, 7, 8, the two cranks being at 180° to one another. The cranks 7 and 8 each carry a wheel 9. Further back on the frame 1, two double arms 10 are pivoted with their fulcrums carried on an axle 11 free to rotate. The front free end of each double arm bears against the free end of an arm 4, and the other free, rear end of arm 10 carries an axle 12 which is free to rotate and which forms the middle part of a double crank 12, 13, 14, the cranks 13 and 14 forming the axles for a rear wheel pair 15. At the free end of each front arm 4 on an upstanding portion located adjacent a vertical plane passed through the axle 6, there is fitted a hydraulic lifting mechanism 16 which, with a roller 17, bears against the front end of arm 10. As can be seen from FIG. 1, the front end of arm 10 is extended a distance forwardly beyond roller 17 so that the parts do not roll off each other upon vertical swinging movement of arms 4 and 10 relative to each other. Preferably, the distances a, between the main axles of the trailer should be the same. Similarly the distances b, between the axles on the double cranks should also be the same. The hydraulic mechanism 16 may be in the form of a hydraulic shock absorber or hydraulic spring-mechanism.

I claim:
1. A vehicle chassis having front and rear wheels on each side, a front arm pivotally secured at its front end to a forward point on one side of the chassis and extending rearwardly downwardly, a front axle carried by the rear end of the front arm, at least one front wheel carried by said front axle, a rear arm pivotally secured between its ends to a rear point on said one side of the chassis, a rear axle carried by the rear end of said rear arm, at least one rear wheel carried by said rear axle, said rear end of said front arm having a portion that is disposed a substantial distance above said front axle when the vehicle is on level ground, the front end of said rear arm resting on said portion of said front arm at a point that is disposed a substantial distance above said front axle when the vehicle is on level ground and that is substantially no farther from said forward point than said front axle is distant from said forward point.

2. A vehicle chassis as claimed in claim 1, said front and rear axles being in the form of double cranks having the middle part pivoted in the front and rear arms, respectively, there being a pair of front wheels on the ends of the front axle and a pair of rear wheels on the ends of the rear axle with the midportion of the axles disposed between the axes of the associated wheels.

3. A vehicle chassis as claimed in claim 2, the ends of the axles extending in opposite directions from the midportion of their associated axle.

4. A vehicle chassis as claimed in claim 1, the front end of said rear arm resting on said portion of said front arm at a point substantially the same distance from said forward point as the front axle is distant from said forward point.

5. A vehicle chassis as claimed in claim 1, the horizontal distances between said rear axle and said rear point, and between said rear point and said front axle, and between said front axle and said forward point, being substantially equal to each other.

6. A vehicle chassis as claimed in claim 1, and anti-friction means between the front end of said rear arm and said portion of said front arm.

7. A vehicle chassis as claimed in claim 1, and means yieldably interconnecting the front end of said rear arm and said portion of said front arm.

8. A vehicle chassis as claimed in claim 1, said forward and rear points being fixed relative to said chassis.

References Cited

UNITED STATES PATENTS

| 2,493,023 | 1/1950 | Pointer | 280—104.5 |
| 2,493,024 | 1/1950 | Pointer | 280—104.5 |
| 2,493,025 | 1/1950 | Pointer | 280—104.5 |
| 2,493,026 | 1/1950 | Pointer | 280—104.5 |
| 2,660,450 | 11/1953 | Stigum et al. | 280—104.5 |
| 2,706,121 | 4/1955 | Ronning | 280—104.5 |
| 2,764,421 | 9/1956 | Ronning | 280—104.5 |
| 2,857,170 | 10/1958 | Compton | 280—104.5 |

BENJAMIN HERSH, Primary Examiner.
C. C. PARSONS, Assistant Examiner.